(12) United States Patent
Kobayashi et al.

(10) Patent No.: US 6,473,096 B1
(45) Date of Patent: Oct. 29, 2002

(54) DEVICE AND METHOD FOR GENERATING SCENARIO SUITABLE FOR USE AS PRESENTATION MATERIALS

(75) Inventors: Yuji Kobayashi; Nobuo Suzuki; Tooru Ishigaki, all of Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/386,365

(22) Filed: Aug. 31, 1999

(30) Foreign Application Priority Data

Oct. 16, 1998 (JP) .......................................... 10-295888
Feb. 25, 1999 (JP) .......................................... 11-047682

(51) Int. Cl.$^7$ ................................................ G09G 5/00
(52) U.S. Cl. ........................ 345/731; 345/730; 345/732; 345/753; 707/500.1; 707/517
(58) Field of Search .............................. 707/101, 104.1, 707/500.1, 515, 517; 345/730, 731, 732, 753

(56) References Cited

U.S. PATENT DOCUMENTS

| | | | | |
|---|---|---|---|---|
| 6,161,114 A | * | 12/2000 | King et al. | 707/517 |
| 6,195,093 B1 | * | 2/2001 | Nelson et al. | 345/732 |
| 6,330,004 B1 | * | 12/2001 | Matsuzawa et al. | 345/723 |
| 6,332,147 B1 | * | 12/2001 | Moran et al. | 707/500.1 |

FOREIGN PATENT DOCUMENTS

| | | |
|---|---|---|
| JP | A-8-115335 | 5/1996 |
| JP | A-8-147264 | 6/1996 |
| JP | A-8-180036 | 7/1996 |

* cited by examiner

*Primary Examiner*—Ba Huynh
(74) *Attorney, Agent, or Firm*—Oliff & Berridge, PLC

(57) ABSTRACT

Described herein are a device and a method of generating a scenario used for presentation materials. A descriptive operation input part is used to perform descriptive operation while contents retained in a contents holding part is being reproduced and operated under control by a contents reproducing part. A history indicative of the descriptive operations is retained in a descriptive operation history holding part and speaker information from a speaker information input part is retained in a speaker information holding part. In a scenario generation processing part, a history information separating part separates the history information related to the descriptive operations into information. Based on the separated information, a descriptive operation contents generating part generates tool-operation reproducing contents, which is in turn retained in a descriptive operation contents holding part. A scenario output part generates a basic scenario, based on history information related to control operations and adds the relationship of synchronism and reproduction between the descriptive operation contents and the speaker information to the basic scenario to thereby complete a scenario.

13 Claims, 19 Drawing Sheets

FIG. 4

HISTORY INFORMATION
50

| | |
|---|---|
| 0 : 00 . 00 | START (Test01) ; |
| 0 : 00 . 02 | PlayStart (play01, Image01 . jpg, 01) ; |
| 0 : 01 . 00 | PlayStart (play02, Mov01 . mov, 02) ; |
| 0 : 03 . 54 | ToolOn (Tool01, COMMAND BAR, play01) ; |
| 0 : 04 . 30 | ToolEnd (Tool01) ; |
| 0 : 05 . 00 | PlayEnd (Play01) ; |
| 0 : 05 . 10 | PlayStart (play03, Text01 . txt, 01) ; |
| 0 : 05 . 54 | ToolOn (Tool02, COMMAND BAR, play02) |
| 0 : 06 . 15 | PlayControl (play03, code** (**,*,*)) ; |
| 0 : 06 . 30 | ToolEnd (Tool02) ; |
| 0 : 07 . 15 | PlayEnd (Play03) ; |
| 0 : 08 . 00 | PlayEnd (Play02) ; |
| 0 : 08 . 05 | END (Test01) ; |

HISTORY INFORMATION OF EVENT SEQUENCE
RELATED TO CONTROL OPERATIONS

```
51
0 : 00 . 00    START (Test01) ;
0 : 00 . 02    PlayStart (play01, Image01 . jpg, 01) ;
0 : 01 . 00    PlayStart (play02, Mov01 . mov, 02) ;
0 : 05 . 00    PlayEnd (Play01) ;
0 : 05 . 10    PlayStart (play03, Text01 . txt, 01) ;
0 : 06 . 15    PlayControl (play03, code** (**,*,*)) ;
0 : 07 . 15    PlayEnd (Play03) ;
0 : 08 . 00    PlayEnd (Play02) ;
0 : 08 . 05    END (Test01) ;
```

FIG. 7

BASIC SCENARIO
— 52

```
<SCENARIO>
<head>
  <Window NAME="Win1", POSITION="0, 0", SIZE="200, 100", LAYER="0">
  <Window NAME="Win2", POSITION="200, 0", SIZE="200, 100", LAYER="0">
</head>
<Body>
<PARALLEL>
  <SEQUENTIAL>
    <Image File="Image01.jpg", DELAYED TIME="2s", Window="Win1", DISPLAY TIME="4m58s">
    <Text File="Text01.txt", DELAYED TIME="5m10s", Window="Win1",
           DISPLAY TIME="2m05s", CONTROL=1m05s, code**(**,*,*)">
  </SEQUENTIAL>
  <MOVE File="Mov01.mov", DELAYED TIME="1m00s", Window="Win2", DISPLAY TIME="7m00s">
</PARALLEL>
</Body>
</SCENARIO>
```

FIG. 8

HISTORY INFORMATION OF EVENT SEQUENCE
RELATED TO DESCRIPTIVE OPERATIONS
53

| | |
|---|---|
| 0 : 00 . 00 | START (Test01) ; |
| 0 : 03 . 54 | ToolOn (Tool01, COMMAND BAR, play01) ; |
| 0 : 04 . 30 | ToolEnd (Tool01) ; |
| 0 : 05 . 54 | ToolOn (Tool02, COMMAND BAR, play02) |
| 0 : 06 . 30 | ToolEnd (Tool02) ; |
| 0 : 08 . 05 | END (Test01) ; |

FIG. 9

SCENARIO ALLOWING FOR
DESCRIPTIVE OPERATION CONTENTS
/ 54

```
<SCENARIO>
<head>
   <Window NAME="Win1", POSITION="0, 0", SIZE="200, 100", LAYER="0">
   <Window NAME="Win2", POSITION="200, 0", SIZE="200, 100", LAYER="0">
*  <Window NAME="Win11", POSITION="0, 0", SIZE="200, 100", LAYER="1">
*  <Window NAME="Win21", POSITION="200, 0", SIZE="200, 100", LAYER="1">
</head>
<Body>
<PARALLEL>
   <SEQUENTIAL>
      <PARALLEL>
*        <Image File="Image01.jpg", DELAYED TIME="2s", Window="Win1", DISPLAY TIME="4m58s">
**       <MOVE File="Tool01.mov", DELAYED TIME="3m54s", Window="Win11", DISPLAY TIME="36s">
      </PARALLEL>
*     <Text File="Text01.txt", DELAYED TIME="5m10s", Window="Win1",
                DISPLAY TIME="2m05s", CONTROL=1m05s, code**(**,*,*)">
   </SEQUENTIAL>
   <PARALLEL>
*     <MOVE File="Mov01.mov", DELAYED TIME="1m00s", Window="Win2", DISPLAY TIME="7m00s">
**    <MOVE File="Tool02.mov", DELAYED TIME="5m54s", Window="Win21", DISPLAY TIME="36s">
   </PARALLEL>
</PARALLEL>
</Body>
</SCENARIO>
```

FIG. 10

SCENARIO ALLOWING FOR VOICE DATA
          55

```
<SCENARIO>
<head>
  <Window NAME="Win1", POSITION="0, 0", SIZE="200, 100", LAYER="0">
  <Window NAME="Win2", POSITION="200, 0", SIZE="200, 100", LAYER="0">
  <Window NAME="Win11", POSITION="0, 0", SIZE="200, 100", LAYER="1">
  <Window NAME="Win21", POSITION="200, 0", SIZE="200, 100", LAYER="1">
</head>
<Body>
<PARALLEL>
  <SEQUENTIAL>
    <PARALLEL>
      <Image File="Image01.jpg", DELAYED TIME="2s", Window="Win1", DISPLAY TIME="4m58s">
      <MOVE File="Tool01.mov", DELAYED TIME="3m54s", Window="Win11", DISPLAY TIME="36s">
    </PARALLEL>
    <Text File="Text01.txt", DELAYED TIME="5m10s", Window="Win1",
                             DISPLAY TIME="2m05s", CONTROL=1m05s, code(,*,*)>
  </SEQUENTIAL>
  <PARALLEL>
    <MOVE File="Mov01.mov", DELAYED TIME="1m00s", Window="Win2", DISPLAY TIME="7m00s">
    <MOVE File="Tool02.mov", DELAYED TIME="5m54s", Window="Win21", DISPLAY TIME="36s">
  </PARALLEL>
* <Sound File="Test01.wav", DELAYED TIME="00s", DISPLAY TIME="8m05s">
</PARALLEL>
</Body>
</SCENARIO>
```

FIG. 14

```
<SCENARIO>
<head>
  <Window NAME="Win1",  POSITION="0, 0",     SIZE="200, 100", LAYER="0">
  <Window NAME="Win2",  POSITION="200, 0",   SIZE="200, 100", LAYER="0">
  <Window NAME="Win11", POSITION="0, 0",     SIZE="200, 100", LAYER="1">
  <Window NAME="Win21", POSITION="200, 0",   SIZE="200, 100", LAYER="1">
* <Window NAME="Win12", POSITION="0, 0",     SIZE="300, 150", LAYER="0", ADJUSTMENT="fit">
* <Window NAME="Win22", POSITION="300, 50",  SIZE="100, 50",  LAYER="0", ADJUSTMENT="fit">
* <Window NAME="Win13", POSITION="0, 0",     SIZE="300, 150", LAYER="1", ADJUSTMENT="fit">
</head>
<Body>
. . . . .
</Body>
</SCENARIO>
```

```
<SCENARIO>
<head>
 . . . . . . . . . .
</head>
<Body>
<PARALLEL>
 <SEQUENTIAL>
  <PARALLEL>
   <SEQUENTIAL>
    <Image File="Image01.jpg", DELAYED TIME="2s", Window="Win1", DISPLAY TIME="3m52s">
    <Image File="Image01.jpg", DELAYED TIME="3m54s", Window="Win12", DISPLAY TIME="36s">
    <Image File="Image01.jpg", DELAYED TIME="4m30s", Window="Win1", DISPLAY TIME="30s">
   </SEQUENTIAL>
   <MOVE File="Tool01.mov", DELAYED TIME="5m54s", Window="Win11", DISPLAY TIME="36s">
  </PARALLEL>
  <Text File="Text01.txt", DELAYED TIME="5m10s", Window="Win1",
                DISPLAY TIME="2m05s", CONTROL=1m05s, code**(*,*,*)">
 </SEQUENTIAL>
 <PARALLEL>
  <MOVE File="Mov01.mov", DELAYED TIME="1m00s", Window="Win2", DISPLAY TIME="7m00s">
  <MOVE File="Tool02.mov", DELAYED TIME="5m54s", Window="Win21", DISPLAY TIME="36s">
 </PARALLEL>
 <Sound File="Test01.wav", DELAYED TIME="00s", DISPLAY TIME="8m05s">
</PARALLEL>
</Body>
</SCENARIO>
```

FIG. 16

```
<SCENARIO>
<head>
  .  .  .  .  .  .  .
</head>
<Body>
<PARALLEL>
 <SEQUENTIAL>
  <PARALLEL>
   <SEQUENTIAL>
    <Image File="Image01.jpg", DELAYED TIME="2s", Window="Win1", DISPLAY TIME="3m52s">
    <Image File="Image01.jpg", DELAYED TIME="3m54s", Window="Win12", DISPLAY TIME="36s">
    <Image File="Image01.jpg", DELAYED TIME="4m30s", Window="Win1", DISPLAY TIME="30s">
   </SEQUENTIAL>
   <MOVE File="Tool01.mov", DELAYED TIME="3m54s", Window="Win13", DISPLAY TIME="36s">
  </PARALLEL>
* <Text File="Text01.txt", DELAYED TIME="5m10s", Window="Win1",
                DISPLAY TIME="2m05s", CONTROL=1m05s, code**(**,*,*)>
 </SEQUENTIAL>
 <PARALLEL>
  <MOVE File="Mov01.mov", DELAYED TIME="1m00s", Window="Win2", DISPLAY TIME="7m00s">
  <MOVE File="Tool02.mov", DELAYED TIME="5m54s", Window="Win21", DISPLAY TIME="36s">
 </PARALLEL>
 <Sound File="Test01.wav", DELAYED TIME="00s", DISPLAY TIME="8m05s">
</PARALLEL>
</Body>
</SCENARIO>
```

```
<SCENARIO>
<head>
   ............
</head>
<Body>
<PARALLEL>
  <SEQUENTIAL>
    <PARALLEL>
      <SEQUENTIAL>
         ............
      </SEQUENTIAL>
      <MOVE File="Tool01.mov", DELAYED TIME="3m54s", Window="Win13", DISPLAY TIME="36s">
    </PARALLEL>
    <Text File="Text01.txt", DELAYED TIME="5m10s", Window="Win1",
                             DISPLAY TIME="2m05s", CONTROL=1m05s, code**('*,*,*')">
  </SEQUENTIAL>
  <SEQUENTIAL>
    <MOVE File="Mov01.mov", DELAYED TIME="1m00s", Window="Win2", DISPLAY TIME="2m54s">
    <MOVE File="Mov01.mov", DELAYED TIME="3m54s", Window="Win22",
                            START POSITION="2m54s", DISPLAY TIME="36s">
    <MOVE File="Mov01.mov", DELAYED TIME="4m30s", Window="Win2",
                            START POSITION="3m30s", DISPLAY TIME="3m30s">
  </SEQUENTIAL>
  <SEQUENTIAL>
    <MOVE File="Tool02.mov", DELAYED TIME="5m54s", Window="Win21", DISPLAY TIME="36s">
  </PARALLEL>
  <Sound File="Test01.wav", DELAYED TIME="00s", DISPLAY TIME="8m05s">
</PARALLEL>
</Body>
</SCENARIO>
```

FIG. 18

```
<SCENARIO>
<head>
 <Window NAME="Win1", POSITION="0, 0", SIZE="200, 100", LAYER="0">
 <Window NAME="Win2", POSITION="200, 0", SIZE="200, 100", LAYER="0">
</head>
<Body>
 <PARALLEL>
  <SEQUENTIAL>
*   <Original src=File : Image01 .jpg>
     <Image File="Image01 .jpg", DELAYED TIME="2s", Window="Win1",
                                 DISPLAY TIME="4m58s">
    </Original>
*   <Text File="Text01 . txt", DELAYED TIME="5m10s", Window="Win1",
                               DISPLAY TIME="2m05s", CONTROL=1m05s, code**(**,*,*)">
  </SEQUENTIAL>
   <Original src=File : Mov01 .mov>
*   <MOVE File="Mov01 .mov", DELAYED TIME="1m00s", Window="Win2",
                             DISPLAY TIME="7m00s">
*  </Original>
 </PARALLEL>
</Body>
</SCENARIO>
```

SCENARIO ALLOWING FOR NOTED CONTENTS
~54a

```
<SCENARIO>
<head>
  <Window NAME="Win1", POSITION="0, 0", SIZE="200, 100", LAYER="0">
  <Window NAME="Win2", POSITION="200, 0", SIZE="200, 100", LAYER="0">
  <Window NAME="Win11", POSITION="0, 0", SIZE="200, 100", LAYER="1">
  <Window NAME="Win21", POSITION="200, 0", SIZE="200, 100", LAYER="1">
</head>
<Body>
<PARALLEL>
  <SEQUENTIAL>
    <PARALLEL>
*     <Image File="Image01.jpg", DELAYED TIME="2s", Window="Win1",
          DISPLAY TIME="4m58s", NOTE="True">
      <MOVE File="Tool01.mov", DELAYED TIME="3m54s", Window="Win11", DISPLAY TIME="36s">
    </PARALLEL>
    <Text File="Text01.txt", DELAYED TIME="5m10s", Window="Win1",
          DISPLAY TIME="2m05s", CONTROL=1m05s, code(,*,*)>
  </SEQUENTIAL>
  <PARALLEL>
*   <MOVE File="Mov01.mov", DELAYED TIME="1m00s", Window="Win2",
          DISPLAY TIME="7m00s", NOTE="True">
    <MOVE File="Tool02.mov", DELAYED TIME="5m54s", Window="Win21", DISPLAY TIME="36s">
  </PARALLEL>
</PARALLEL>
</Body>
</SCENARIO>
```

DEVICE AND METHOD FOR GENERATING SCENARIO SUITABLE FOR USE AS PRESENTATION MATERIALS

BACKGROUND OF THE INVENTION

1. Field of the Invention

The present invention relates to a device and a method for generating a scenario suitable for use as presentation materials, and particularly to a device and a method of generating a scenario used for presentation materials, wherein a reproduced scenario of a multimedia title, which has described layout information of respective contents and the relationship of synchronism and reproduction between the contents in multimedia contents including text data, image data, motion picture data, voice data, programs, etc., i.e., a reproduced scenario intended for a title, which is suitable for use as materials at the time that a presentation is done asynchronously and on a non-facing basis through a network, is generated.

2. Description of the Related Art

Upon a general presentation used for the descriptions or the like of the presentation of research work, and a planned proposal, the descriptions have heretofore been made based on various materials on the spot where the persons concerned have gathered in a hall room. When conferences or the like are held at a conference room in which various audio visual devices such as a plurality of OHP (Overhead Projectors), a video device, are installed, the style is general that the presentation is done by explaining materials on hand in front of participants while an explainer is displaying the materials on the screen or a video monitor through the use of these devices.

There has recently been a particular increase in example in which a presentation is done while a multimedia title generated by a multimedia authoring system using a computer connected to a projector is being reproduced by the computer.

As to the presentation executed while such a multimedia title is being reproduced by the computer, there is known "Multimedia Processing Device" disclosed in Japanese Published Unexamined Patent Application No. Hei 8-115335, for example. A command bar acts as an important role when the presentation is performed in real time. In the present example, however, information about the multimedia title is described in a work in advance to utilize a pointing device as the effective command bar upon reproduction of the multimedia title, and a display image of the pointing device is controlled synchronously with the contents of the work upon reproduction, whereby screen operations under the presentation are made more effective. Further, a progress control command such as form feed or the like is associated with voice data of an explainer and recognized and executed from the voice of the explainer, thereby making it possible to smoothly perform a screen operation of the presentation.

When such a presentation using the computer is performed, it is necessary to create the multimedia title in advance by using the multimedia authoring system. However, the creation of such a multimedia tile needs a special technique such as general highly-developed programming.

On the other hand, an attempt has been made to simplify authoring requiring an advanced speciality to some extent. As an example thereof, there is known, for example, "Multimedia Presentation Edit Execution Device" described in Japanese Published Unexamined Patent Application No. Hei 8-147264. In the present example, a multimedia title can be created without programming in accordance with a system for inputting and setting reproduce/display timings of respective multimedia contents utilizing an interface having minimized a keyboard input and a human sense of time elapse, i.e., each scene changeover operating timing actually done by a human without a special sense of authoring.

Meanwhile, in the current network community in which an Internet and an Intranet have been rapidly penetrated, work has been done in work styles different from the conventional ones. Persons to be on duty at remote sites are now at work in cooperation with one another through communications via a network in particular. It is considered that when the presentation is taken into consideration in such a work style, there is an increase in the opportunity of a presentation done asynchronously and on a non-facing basis through a network, rather than the presentation performed synchronously and on a facing basis at the conference room or the like where the persons concerned have gathered in a hall room as in the conventional example.

When the presentation using the computer is carried out, it is necessary to create the multimedia title in advance by using the multimedia authoring system as described above. Thus, the special technique such as the highly-developed programming or the like has been required for its purposes. However, when the presentation done asynchronously and on the non-facing basis is taken into consideration, the situation becomes further complex. Namely, it is necessary to contain the description conventionally done by the explainer upon the presentation in the created multimedia title for the presentation as information in advance. To this end, further complex authoring work is needed. However, when presentation materials are supposed to be created as a part of the general office work without creating commercial movies, it is desirable to use a creating method having no concept of authoring.

As to the authoring which imagines such a presentation done asynchronously and on the non-facing basis, there is known "Method for Constituting Multimedia Presentation Materials and System therefor" described in Japanese Published Unexamined Patent Application No. Hei 8-180036, for example. The present example provides an authoring system wherein presented conditions such as presented magnifications, presented time, etc. for all the presented materials used as a base are set and registered, and attached materials for processing the presented materials every present materials are next created, set and registered, and scenario files in which the contents of processing of the presented conditions and presented time are edited in time sequence every materials presented from the registered data, are then set and registered, whereby the daily-created materials can be utilized as they are and the special technique becomes unnecessary.

In Japanese Published Unexamined Patent Application No. Hei 8-115335 referred to above, when a multimedia title is reproduced by using a computer connected to a projector and a presentation is done while its description is being performed, information is described in a work in advance so that a mouse cursor exhibits an effective function as a command bar, and a display image of the cursor is controlled upon reproduction to thereby set the presentation more effectively. The extraction of a keyword related to the operation of the computer from voice recognition of an explainer allows an improvement in screen operation during the presentation. However, this relates to the presentation done synchronously and in the facing form at a conference room or the like where the persons concerned have gathered in a hall room. This is not related to the presentation done asynchronously and on the non-facing basis through the network. It is also necessary to describe various mouse cursor control information in the multimedia title upon authoring in advance so that the mouse cursor exerts the effective function of command bar upon reproduction of the multimedia title. The authoring work difficult in addition to the general fatigue leads to further difficulties and labor.

In Japanese Published Unexamined Patent Application No. Hei 8-147264 as well, a multimedia title can be created without viewing a cumbersome timing chart and performing programming owing to, for example, the layout of objects using a graphical user interface and the definition of their reproduction sequence, and the input and setting of the timing provided to start the reproduction of the next object while the related objects are being reproduced and confirmed. However, these are limited to an improvement in the user interface with respect to the conventional authoring system. Thus, this is essentially nothing but the conventional authoring system. When the descriptions conventionally made by the explainer upon the presentation as for the presentation done asynchronously and on the nonfacing basis are included in the multimedia title as the information in advance as described above, further complex and cumbersome authoring work is needed even if the special technique such as the programming would become unnecessary.

Further, in Japanese Published Unexamined Patent Application No. Hei 8-180036, the descriptions made so far by the explainer upon the presentation can be created, set and registered in the form of the attached materials for processing of the presented materials. Further, the multimedia title for the presentation performed asynchronously and on the non-facing basis can be subjected to authoring without any special technique. However, the procedure of setting and registering the presented time, presented magnifications, display sequence, etc. of the presented materials every presented materials and creating and registering the attached materials every presented materials is essentially nothing but the conventional authoring working. Accordingly, the present example has a problem in that the cumbersome authoring working must be performed in which each individual parts are defined, insufficient parts are created and defined, and the defined parts are piled on each other to thereby make an overall configuration.

SUMMARY OF THE INVENTION

With the foregoing in view, it is therefore an object of the present invention to provide a device and a method for generating a scenario suitable for use as presentation materials, wherein a multimedia title for a presentation done asynchronously and on a non-facing basis over a network can be generated by a method similar to daily-executed presentation action without a sense of authoring action to the utmost.

According to one aspect of the invention, for achieving the above object, there is provided a device for generating a scenario suitable for use as presentation materials, wherein a reproduced scenario describing layout information of respective contents and a relationship of synchronism and reproduction between the contents in multimedia contents used for a presentation, comprising a contents holding part that retains therein multimedia contents including text data, image data, motion picture data, voice data and programs; a contents reproducing part that reads corresponding contents from the contents holding part, based on control operations of an explainer and reproducing and displaying the read contents; a speaker information input part that receives therein speaker information including at least voice information upon reproduction of the multimedia contents by the contents reproducing part; a speaker information holding part that retains therein the speaker information inputted from the speaker information input part; a descriptive operation input part that receives therein descriptive operations including control operations relative to the contents reproducing part and command operations relative to a specific display point of the reproduced contents displayed by the contents reproducing part; a descriptive operation history holding part that retains therein history information related to the descriptive operations inputted by the descriptive operation input part; a scenario generation processing part that determines layout information of respective contents and the relationship of synchronism and reproduction between the contents in relation to a group of the contents reproduced by the contents reproducing part in accordance with the history information, a group of descriptive operation contents for reproducing the command operations and the speaker information retained in the speaker information holding part to thereby generate a reproduced scenario having a multimedia title; a descriptive operation contents generating part that generates the descriptive operation contents of an image for reproducing command operations, based on information about the command operations in the history information; a descriptive operation contents holding part that retains therein the descriptive operation contents generated by the descriptive operation contents generating part; and a scenario information holding part that retains therein the reproduced scenario generated by the scenario generation processing part.

According to the scenario generation device referred to above, the explainer operates the contents reproducing part to selectively read the multimedia contents including the text data, image data, motion picture data, voice data and programs retained in the contents holding part and reproduce and display the selected contents. While viewing the displayed contents at this time, the descriptive operations including the control operations relative to the contents reproducing part and the command operations relative to the specific display point of the reproduced contents displayed by the contents reproducing part are inputted via the descriptive operation input part, and the speaker information related to the in-reproduction contents is inputted via the speaker information input part. Thus, the history information related to the descriptive operations inputted by the descriptive operation input part is retained in the descriptive operation history holding part, whereas the speaker information inputted by the speaker information input part is retained in the speaker information holding part. The scenario generation processing part analyzes the history information of the descriptive operations, generates a scenario having described the layout information of the respective contents and the relationship of synchronism and reproduction between the contents in a predetermined format, based on the result of analysis with respect to the group of contents reproduced by the contents reproducing part, the group of descriptive operation contents generated by the descriptive operation contents generating part, and the speaker information retained in the speaker information holding part, and retains it in the scenario information holding part. The descriptive operation contents generating part generates the descriptive operation contents of the image for reproducing the command operations, based on the information about the command operations in the history information and retains it in the descriptive operation contents holding part. Thus, the explainer performs the descriptive operations while reproducing the contents of the presentation materials by himself or herself and performs the presentation spontaneously. In other words, the descriptive operations and the speaker information are recorded without making a particular sense of authoring action, and the scenario for reproducing the multimedia title for the presentation done asynchronously and on the non-facing basis can be created from the recorded information.

According to another aspect of the invention, there is provided a method of generating a scenario suitable for use as presentation materials, wherein a reproduced scenario having described layout information of respective contents and a relationship of synchronism and reproduction between the contents in multimedia contents used for a presentation is generated, comprising the following the steps of: reproducing and displaying multimedia contents including text data, image data, motion picture data, voice data and programs, based on reproduction operations of an explainer; recording descriptive operations including control operations of the explainer and command operations relative to a specific display point of the displayed reproduced contents and recording speaker information of the explainer, including at least voice information; determining layout information of respective contents and the relationship of synchronism and reproduction between the contents in relation to a group of the reproduced contents, a group of descriptive operation contents for reproducing the command operations and the recorded speaker information of the explainer, based on the recorded control operations, thereby to generate a reproduced scenario having a multimedia title; and generating the group of descriptive operation contents, based on information about the command operations of the recorded descriptive operations.

According to the scenario generating method referred to above, while the multimedia contents including the text data, image data, motion picture data, voice data and programs are being reproduced and displayed, the descriptive operations including the control operations of the explainer and the command operations relative to the specific display point of the reproduced contents displayed, and the speaker information of the explainer are recorded. Further, the layout information of the respective contents and the relationship of synchronism and reproduction between the contents are described in a predetermined format, based on the recorded control operations in relation to the group of the reproduced contents, the group of the subsequently-generated descriptive operation contents and the recorded speaker information thereby to generate a scenario. Furthermore, the group of the descriptive operation contents is generated based on the information about the command operations in the recorded descriptive operations. Thus, the explainer performs the descriptive operations while reproducing the contents and executes the presentation spontaneously, whereby the behaviors thereof are recorded and the scenario for reproducing the multimedia title for the presentation done asynchronously and on the non-facing basis on the basis of them can be generated.

According to a further aspect of the invention, there is provided a computer-readable recording medium having recorded therein a scenario generation program for presentation materials, for generating a reproduced scenario having described layout information of respective contents and the relationship of synchronism and reproduction between the contents in multimedia contents used for a presentation, comprising: a contents reproducing part that reads and reproduces the corresponding contents from the multimedia contents including text data, image data, motion picture data, voice data and programs, based on control operations of an explainer; a speaker information recording part that receives and records therein speaker information including at least voice information upon reproduction of the multimedia contents by the contents reproducing part; a descriptive operation recording part that receives therein descriptive operations including control operations relative to the contents reproducing part and command operations relative to a specific display point of the reproduced contents displayed by the contents reproducing part and records the same therein as history information; a scenario generation processing part that determines layout information of respective contents and the relationship of synchronism and reproduction between the contents in relation to a group of the contents reproduced by the contents reproducing part in accordance with the history information, a group of descriptive operation contents for reproducing the command operations and the speaker information retained in the speaker information holding part to thereby generate a reproduced scenario having a multimedia title; and a descriptive operation contents generating part that generates the descriptive operation contents of an image for reproducing control operations, based on information about the command operations in the history information.

The scenario generation program for the presentation materials, which has been recorded in the above-described medium, is executed by the computer, whereby the respective functions of the contents reproducing part, the speaker information recording part, the descriptive operation recording part, the scenario generation processing part and the descriptive operation contents generating part can be implemented by the computer.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 4 is a diagram showing one example of history information about descriptive operations;

FIG. 7 is a diagram showing an example of a basic scenario generated from the history information of the event sequences about the control operations;

FIG. 8 is a diagram illustrating history information of event sequences about descriptive operations;

FIG. 9 is a diagram depicting a generated example of a scenario to which the relationship of synchronism and reproduction between the contents of descriptive operations is added;

FIG. 10 is a diagram showing a generated example of a scenario to which the relationship of synchronism and reproduction between voice data is added;

FIG. 14 is a diagram illustrating a partial scenario in which new windows are defined;

FIG. 15 is a diagram depicting a partial scenario indicative of re-definition of the contents to be noted;

FIG. 16 is a diagram showing a partial scenario indicative of reproduction definition of descriptive operation contents relative to the contents to be noted;

FIG. 17 is a diagram illustrating a partial scenario indicative of reproduction definition of contents to be reproduced in the same time as that for the contents to be noted;

FIG. 18 is a diagram showing a generated example of a scenario with link information embedded therein;

FIG. 20 is a diagram showing a generated example of a scenario which has taken into consideration the contents to be noted.

DETAILED DESCRIPTION OF THE PREFERRED EMBODIMENTS

Preferred embodiments of the present invention will hereinafter be described with reference to the accompanying drawings.

Figure 1:
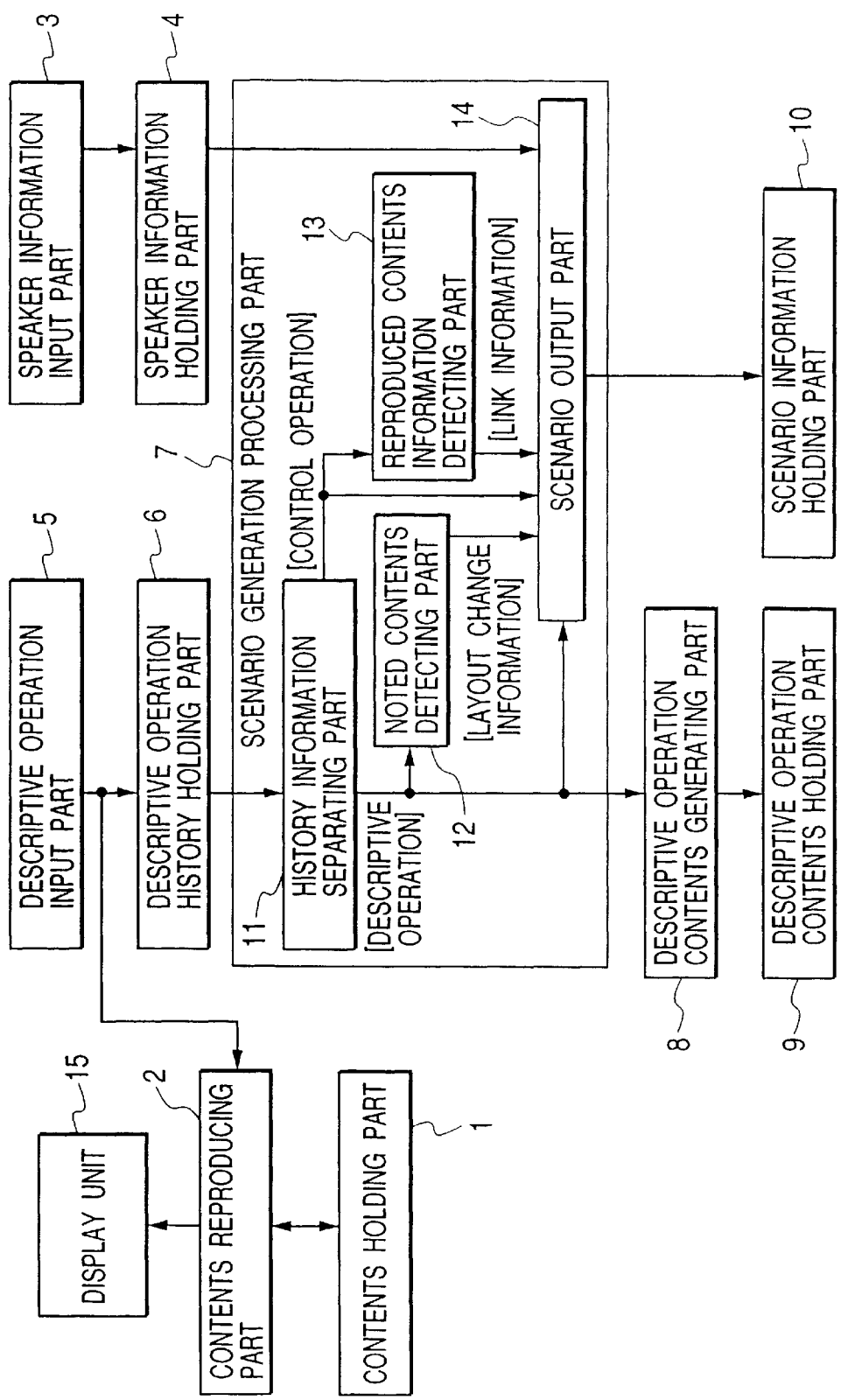
FIG. 1 is a block diagram showing a configuration of the principle of the present invention.

FIG. 1 is a diagram showing a configuration of the principle of the present invention. In FIG. 1, a device for generating a scenario suitable for use as presentation documents or materials, according to the present invention comprises a contents holding part 1, a contents reproducing part 2, a speaker information input part 3, a speaker information holding part 4, a descriptive operation input part 5, a descriptive operation history holding part 6, a scenario generation processing part 7, a descriptive operation contents generating part 8, a descriptive operation contents holding part 9, and a scenario information holding part 10. Further, the scenario generation processing part 7 has a history information separating part 11, a noted contents detecting part 12, a reproduced contents information detecting part 13, and a scenario output part 14. A display unit 15 for displaying a screen for performing control operations of contents and displaying reproduced contents is connected to the output of the contents reproducing part 2.

The contents holding part 1 holds therein a plurality of multimedia contents such as text data, image data, motion picture data, voice data, programs, etc. all of which are used for a presentation. The contents reproducing part 2 reads the corresponding contents from the contents holding part 1 based on control operations of an explainer and performs a reproducing process corresponding to the type of contents, and causes the display unit 15 to display the contents thereon. The speaker information input part 3 inputs speaker information including at least voice information upon reproduction of multimedia contents by the contents reproducing part 2. The speaker information is retained in the speaker information holding part 4. The descriptive operation input part 5 inputs descriptive operations including control operations for the contents reproducing part 2 and command operations for a specific display point of the reproduced contents displayed by the contents reproducing part 2. Its input operations are retained in the descriptive operation history holding part 6 as history information.

In the scenario generation processing part 7, the history information separating part 11 analyzes history information, based on the speaker information retained in the speaker information holding part 4 and the history information retained in the descriptive operation history holding part 6 and separates the history information into first history information related to control operations such as a contents reproduce operation, a contents stop operation, etc. and second history information about command operations using a presentation tool such as a command bar or the like. The first history information related to the control operations, which has been separated by the history information separating part 11, is supplied to the scenario output part 14 where a basic scenario is generated. Further, the noted contents detecting part 12 detects command operations made by an explainer using the presentation tool from the second history information about descriptive operations, which has been separated by the history information separating part 11. The resultant information is supplied to the scenario output part 14 where revisions such as a change in display condition at the reproduction of contents to be noted, etc. are effected on the basic scenario when a plurality of pieces of contents are being reproduced in parallel. Further, the second history information related to the descriptive operations from the history information separating part 11 is supplied to the descriptive operation contents generating part 8 where motion picture data corresponding to a motion locus of the presentation tool made by the explainer is generated and retained in the descriptive operation contents holding part 9 as descriptive operation contents. Further, the reproduced contents information detecting part 13 detects information about the contents while being reproduced, from the first history information related to the control operations from the history information separating part 1 and supplies information linked to the corresponding contents embedded in a scenario to the scenario output part 14. The scenario output part 14 embeds the information linked to the contents in the basic scenario to thereby create a reproduced scenario of a multimedia title for a presentation done asynchronously and on a non-facing basis on a network. The reproduced scenario is retained in the scenario information holding part 10 as scenario information.

Thus, while the multimedia contents such as the text data, image data, motion picture data, voice data, programs, etc. prepared in advance are being successively reproduced as needed, a description using the presentation tool and a description using the voice will be made according to their displays as needed. When the ordinary description, i.e., a simulated presentation for the present device is completed, a multimedia presentation scenario for reproducing the simulated presentation is automatically generated based on an operation history made in the meantime with respect to the present device. Simultaneously at this time, descriptive operation contents for reproducing the operation of the presentation tool is newly generated to hold voice information. The multimedia presentation scenario generated by the scenario output part 14 is one having described a synchronism and reproduction relationship and layout information, which are related to contents reproduced under the simulated presentation, the newly-generated descriptive operation contents and the voice information. The asynchronism and nonfacing-based presentation can be implemented by reproducing the contents reproduced under the simulated presentation and the newly-generated description operation contents and the voice information, based on the scenario.

A description will next be made of an embodiment in which the scenario generating device according to the present invention is applied to a personal computer.

Figure 2:
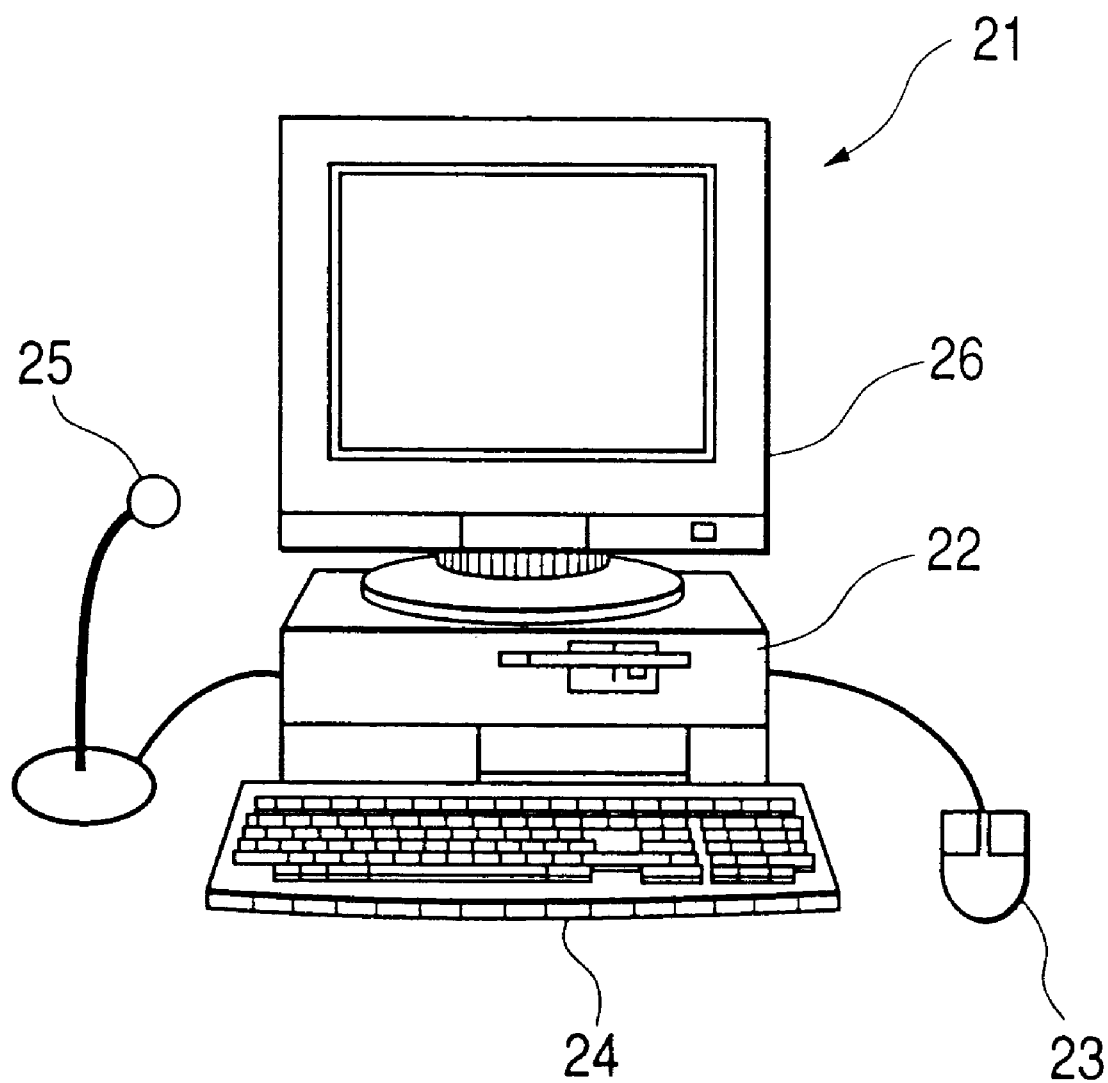
FIG. 2 is a diagram illustrating an outward appearance of a personal computer.

FIG. 2 is a diagram showing an external appearance of a personal computer. The personal computer 21 comprises a system unit 22, a mouse 23, a keyboard 24, a microphone 25, and a display 26. Now, the mouse 23 and the keyboard 24 correspond to the descriptive operation input part 5 shown in FIG. 1, the microphone 25 corresponds to the speaker information input part 3, the display 26 corresponds to the display unit 15, and the system unit 22 corresponds to other components, respectively. Of these, the contents holding part 1, the speaker information holding part 4, the descriptive operation history holding part 6, the descriptive operation contents holding part 9 and the scenario information holding part 10 are implemented by generating or creating a directory for storing contents, a directory for storing voice data, a directory for storing descriptive operation history information, a directory for storing descriptive operation contents, and a directory for storing each scenario over a file system of the personal computer 21, for example. The contents reproducing part 2 and the scenario generation processing part 7 is constructed of software executed by the personal computer 21.

Figure 3:
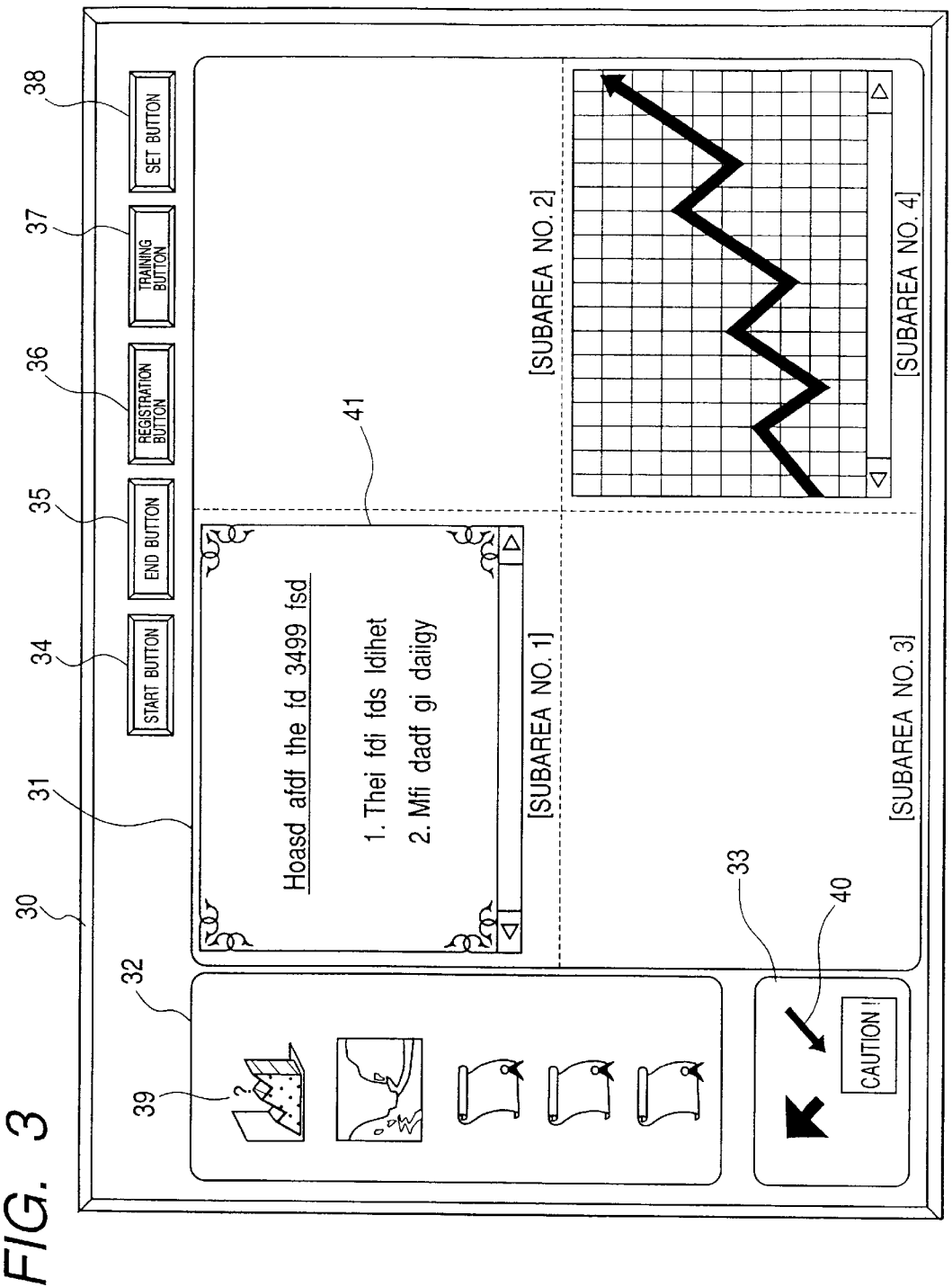
FIG. 3 is a diagram depicting an example of a screen for a graphical user interface, which is displayed on a display of the personal computer.

FIG. 3 is a diagram showing an example of a screen for a graphical user interface, which is displayed on the display of the personal computer. The screen 30 comprises a contents display area 31, a contents list display area 32, a presentation tool display area 33, a start button 34, an end button 35, a registration button 36, a practice or training button 37 and a set button 38.

In the illustrated example, a plurality of icons 39 indicative of the multimedia contents retained in the contents holding part 1 are represented on the contents list display area 32 in the form of a list. Further, several presentation tools 40 are displayed on the presentation tool display area 33. The presentation tools 40 include a command bar tool, a drawing tool, a noted mark tool, a tag tool, etc. These may be used properly as needed.

Further, the contents display area 31 is divided into four subareas in the illustrated example. The respective subareas are capable of simultaneously reproducing and displaying each individual contents independent of one another. In the illustrated example, reproduced contents 41 are displayed on the two subareas.

Upon a simulated presentation, desired contents is now selected by the mouse 23 from the contents group indicated by the icons on the contents list display area 32 and dragged and dropped to a desired subarea in the contents display area 31, whereby a command for starting the reproduction of cast contents is issued to the contents reproducing part 2 and a reproducing process corresponding to the type of contents referred to above is started. Thus, the contents is displayed and reproduced in the subarea corresponding to the contents cast destination.

A description will next be made of descriptive operations using principally the mouse 23 connected to the personal computer 21. The descriptive operations include operations of various buttons on the screen 30, the above-described operation for issuing the reproduce/start command to the contents reproducing part 2, and command operations for a specific point of reproduced contents. The following operation inputs are performed by a mouse pointer controlled by using the mouse 23.

The record operation of the scenario generation device is started by clicking the start button 34 and terminated by clicking the end button 35. The reproduction of contents by the contents reproducing part 2, which is performed during that time, i.e., under the simulated presentation, information such as voice inputted from the speaker information input part 3, and descriptive operations inputted from the descriptive operation input part 5 are intended for the generation of a scenario.

The registration button 36 is used to register scenario information generated by the scenario generation processing part 7 into the scenario information holding part 10. The scenario information is registered therein by clicking the registration button 36.

The training button 37 is capable of executing the descriptive operations and the like inputted from the descriptive operation input part 5, but is used as a changeover button for operation modes in which their operations are not recorded. Thus, the training button 37 serves as a toggle type. When the training button 37 is switched to an on state, it is brought to a train mode, so that the reproduction of the contents by the contents reproducing part 2, the descriptive operations done by the descriptive operation input part 5, etc. can be performed but no scenario generation is done.

The set button 38 is used to set various operating environments of the scenario generation device. Upon setting of the presentation tool, for example, the presentation tool to be displayed on the presentation tool display area 33 is selected or the place or destination to store the contents or a generated file is set.

Further, reproduce and control buttons corresponding to the type of contents are displayed for respective contents displayed and reproduced on the subareas in the contents display area 31. In the case of the contents of motion picture data, for example, control buttons for playback, stop, forward, rewind, end, etc. are displayed. In the case of the contents of an image or text data, control buttons for scroll, page turning, zoom, end, etc. are displayed. Operations such as reproduce control, contents reproduce completion, etc. are performed by clicking these control buttons.

As to a method of utilizing the presentation tools 40 prepared in the presentation tool display area 33, a desired tool is selected from the presentation tool display area 33 by the mouse 23 and dragged and dropped within the desired subarea reproduced in the contents display area 31, whereby the contents reproduced in the subarea intended for drop can be specified as the contents to be noted, and a descriptive point can be designated by dragging a command bar tool to a point to be noted within the subarea when the command bar tool is selected. Further, the displayed command bar tool is selected by the mouse 23 and the command bar tool can be deleted from over the contents display area 31 by double-clicking it. Even when the contents specified by the command bar tool is reproduced and terminated, the command bar tool is deleted from over the contents display area 31.

Next, when an operation input done during the simulated presentation from the descriptive operation input part 5 is given, descriptive operations thereof are recorded in the descriptive operation history holding part 6. Namely, the descriptive operation history holding part 6 obtains operation input events such as a description, etc. by using instructions for the reproduction of contents, reproduce control and the presentation tools 40 and holds their histories therein.

One example of the history information retained in the descriptive operation history holding part 6 is shown in FIG. 4.

FIG. 4 is a diagram showing one example of history information about descriptive operations. According to the history information 50 illustrated in FIG. 4, time stamps are given to the obtained respective operation input events respectively. Each time stamp is represented by the time that elapsed from the start with the time of the start as 0, for example. After the completion of the time stamps, the contents of the events are described. An example illustrative of the events in FIG. 4 will be described below.

"START (scenario ID)" indicates the start of the simulated presentation. This is received upon clicking of the start button 34. [Scenario ID] indicates an identifier automatically given by the system. This is associated with the voice information retained in the speaker information holding part 4.

"END (scenario ID)" indicates the end of the simulated presentation. This is received upon clicking of the end button 35.

"PlayStart (PlayID, name of contents, display frame No.)" represents that a file indicated by the [name of contents] has started to reproduce at a sub-frame indicated by the [display frame No.]. [PlayID] indicates an identifier automatically given from the system.

"PlayEnd (PlayID)" indicates the end of reproduction of [PlayID].

"PlayControl (PlayID, Control Code)" represents that control on [Control Code] has been performed on the reproduction of [PlayID].

"ToolOn (locus dataID, name of Tool, PlayID)" shows that a presentation tool of [Name of Tool] has started to perform descriptive operations on the reproduction of [PlayID]. [Locus dataID] is automatically given from the system. The coordinates of the position of the presentation tool are recorded in locus data associated with the locus dataID at predetermined time intervals.

"ToolEnd (locus dataID)" indicates the completion of utilization of a presentation tool. At this time, the recording of the coordinates in [locus dataID] is terminated.

The history information retained in the descriptive operation history holding part 6 in the above-described manner is inputted to the scenario generation processing part 7. In the scenario generation processing part 7, the history information separating part 11 separates event information described in the history information into an event related to control operations and an event related to the presentation tools 40.

Figures 5, 6:
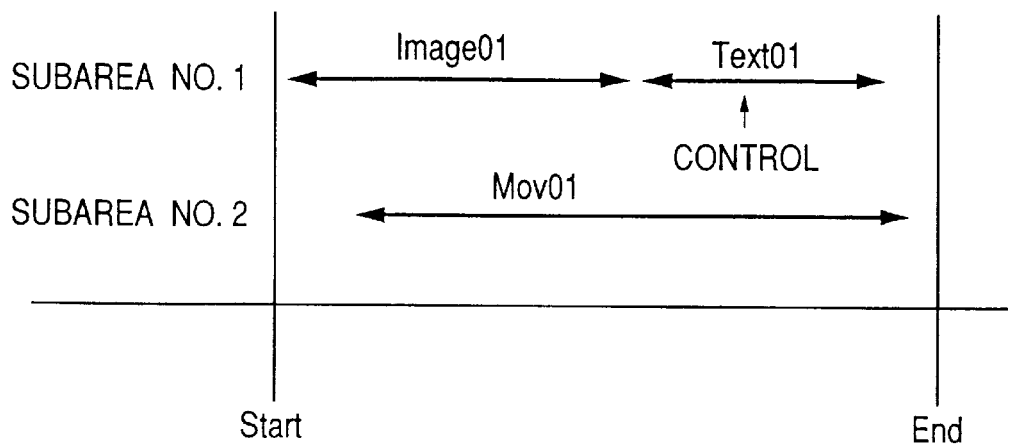
FIG. 5 is a diagram illustrating history information of event sequences related to control operations.
FIG. 6 is a timing chart for describing the event sequences about the control operations.

FIG. 5 is a diagram showing history information of event sequences related to control operations. The history information 51 illustrated herein indicates event sequences related to control operations, which are separated from the history information 50 illustrated in FIG. 4. The flow of time between the reproduced contents can be represented from the history information 51 in the form of a timing chart.

FIG. 6 is a timing chart showing event sequences related to control operations. According to the timing chart, reproduced contents are represented side by side in time sequence every subareas. Namely, a "subarea No. 1" indicates that "Text01" is reproduced subsequently to the reproduction of "Image01" and some control operations are performed while "Text01" is being reproduced. A "subarea No. 2" indicates that the reproduction of "Mov01" is started after the starting of reproduction of "Image01" and its reproduction is terminated after the completion of reproduction of "Text01".

The scenario output part 14 generates a basic scenario based on the history information 51 having the relationship of synchronism and reproduction between such three contents. An example of the generation of such a basic scenario is shown in FIG. 7.

FIG. 7 is a diagram showing the example of the basic scenario generated from the history information of the event sequences about the control operations. In the basic scenario 52 shown in FIG. 7, an element A is represented by a range from a start tag <A> to an end tag </A>. However, when the element does not include other elements thereinside, the end tag is omitted. When an element B has attributes C and D and their attribute values are defined as c and d respectively, their relations are given as <B C="c", D="d">.

In the basic scenario 52 shown in FIG. 7, a <scenario> element comprises a <head> element and a <Body> element. The <head> element includes two <Window> elements. The <Window> elements define windows for reproducing contents and are referred to by attribute values of names respectively. In the above-described example, a Window indicated by Win1 shows a Window of the "subarea No. 1", and a Window indicated by Win2 shows a Window of the "subarea No. 2", respectively.

The <Body> element includes a <parallel> element. The <parallel> element means that elements contained in itself are reproduced in parallel. In the illustrated example, the <parallel> element includes a <sequential> element and a <MOVE> element and defines the reproduction of both in parallel. The <sequential> element means that elements contained in itself are reproduced serially. In the illustrated example, the <sequential> element includes an <Image> element and a <Text> element and defines the reproduction of both in the described order.

The <Image> element, <Text> element and <MOVE> element indicate contents and have reproduction conditions as attributes, respectively. An attribute value of a "File" attribute is a reproduced file name. An attribute value of a "delayed time" attributes corresponds to the time required to start the reproduction of a parent element with the start of reproduction of the parent element as a start point. Further, an attribute value of a "Window" attribute corresponds to a name attribute value of the <Window> element. An attribute value of a "display time" attribute corresponds to the time required to continue the reproduction of the corresponding element. Moreover, an attribute value of a "control" attribute corresponds to a control execution time with the time required to start the reproduction of the corresponding element as a start point, and a control code provided for the reproduction of the corresponding element.

As described above, subareas utilized for the reproduction are first detected from the above-described event sequences related to the control operations and are defined as <Window> elements lying within a <head> element. Next, a <parallel> element is defined within a <Body> element and reproductions in respective subareas are defined within the <parallel> element. When a plurality of reproductions are performed within one subarea at this time, they are defined as elements lying within a <sequential> element. Finally, the contents of a "PlayControl" event is described in a "control" attribute of an element to be controlled. From the above, the basic scenario 52 is generated from the event sequences related to the control operations.

An example of event sequences related to the presentation tools 40 separated from the history information 50 illustrated in FIG. 4 is next shown in FIG. 8.

FIG. 8 is a diagram showing history information of event sequences related to descriptive operations. According to the event sequences of the history information 53 illustrated herein, the separation of two descriptive operations from the history information 50 shown in FIG. 4 is illustrated. Here, description information held at data ID=Tool01 as viewed from "PlayID" corresponds to a description for Image01.jpg, whereas description information held at data ID=Tool02 as viewed therefrom corresponds to a description for Mov01.mov.

Two locus data ID of "Tool01" and "Tool02", locus data associated with the respective locus data ID, and their corresponding Tool names are delivered from the history information 53 to the descriptive operation contents generating part 8 for generating each motion picture used to reproduce the operation of a presentation tool, whereby the generation of motion picture data for command bars corresponding to the respective locus data ID is required of the descriptive operation contents generating part 8. At this time, a file name generated by the descriptive operation contents generating part 8 is defined as" "each locus data ID". mov". Thus, a motion picture file name corresponding to the locus data ID=Tool01 generated by the descriptive operation contents generating part 8 results in Tool01.mov, whereas a motion picture file name corresponding to the locus data ID=Tool02 results in Tool02.mov. Coordinate positions lying within subareas for presentation tools at 0.1 second intervals, for example, are recorded in each locus data. The descriptive operation contents generating part 8 applies an animation effect to a display image corresponding to a Tool name by using the locus data to thereby create motion picture data. Simultaneously with this, the scenario output part 14 performs a process for generating <MOVE> elements corresponding to the respective data ID and embedding them in a basic scenario. The result of the embedding process is shown in FIG. 9.

FIG. 9 is a diagram showing a generated example of a scenario to which the relationship of synchronism and reproduction between the contents of descriptive operations is added. According to the scenario 54 which allows for the contents of the descriptive operations shown in FIG. 9, it is understood that the <MOVE> elements corresponding to the reproduction of movements at the operation of presentation tools have been embedded in the basic scenario 52 shown in FIG. 7. Incidentally, they correspond to lines marked with asterisks at the beginning of the lines.

In order to display movements of command bars represented as motion pictures so as to overlay contents to be described, new windows Win11 and Win21 are defined and layers are specified as 1. Win1 and Win11 are windows identical in position and size from each other and different in layer alone from each other. Attribute values of "layer" attributes mean that when the values are displayed in overlapped form as they increase, they are represented at the top surface. Further, the added respective <MOVE> elements are respectively defined in parallel relations because it is necessary to reproduce them simultaneously with elements to be described.

As described above, the relationship of synchronism and reproduction between the description operation contents generated based on the events related to the presentation tools 40 can be merged into the basic scenario 52 generated based on the events related to the control operations.

Next, the scenario output part 14 of the scenario generation processing part 7 defines the relationship of synchronism and reproduction between the voice data retained in the above-described speaker information holding part 4 in the scenario 54 shown in FIG. 9. A file name of the voice data retained in the speaker information holding part 4 is associated with a scenario ID corresponding to the argument of the START event in the history information 50 illustrated in FIG. 4. Since the argument is "Test01", the file name of the voice data is given as Test01.wav, for example. Incidentally, the voice data inputted during one simulated presentation is managed by one file. An example in which the definition of the relationship of synchronism and reproduction between the voice data is added to the scenario 54 shown in FIG. 9, is illustrated in FIG. 10.

FIG. 10 is a diagram showing a generated example of a scenario to which the relationship of synchronism and reproduction between voice data is added. According to the scenario 55 which allows for the voice data shown in FIG. 10, the voice data is defined as a <Sound> element and can be defined as a relation parallel to a collection for each subarea. In the drawing, a line marked with an asterisk at the beginning of the top thereof is an added line.

While the voice data inputted during one simulated presentation is managed by one file in the present embodiment, it is segmented based on the events related to the aforementioned control operation and the events related to the presentation tools 40, for example and may be managed as another file. In that case, a <sequential> element is defined in the position of the <Sound> element in FIG. 10, and <Sound> elements corresponding to each individual voice files are sequentially defined in the <sequential> element, thereby allowing a scenario representation.

A description will next be made of the operation of the scenario generation device at the time that the scenario generation processing part 7 has a basic configuration comprised of only the history information separating part 11 and the scenario output part 14.

Figure 11:
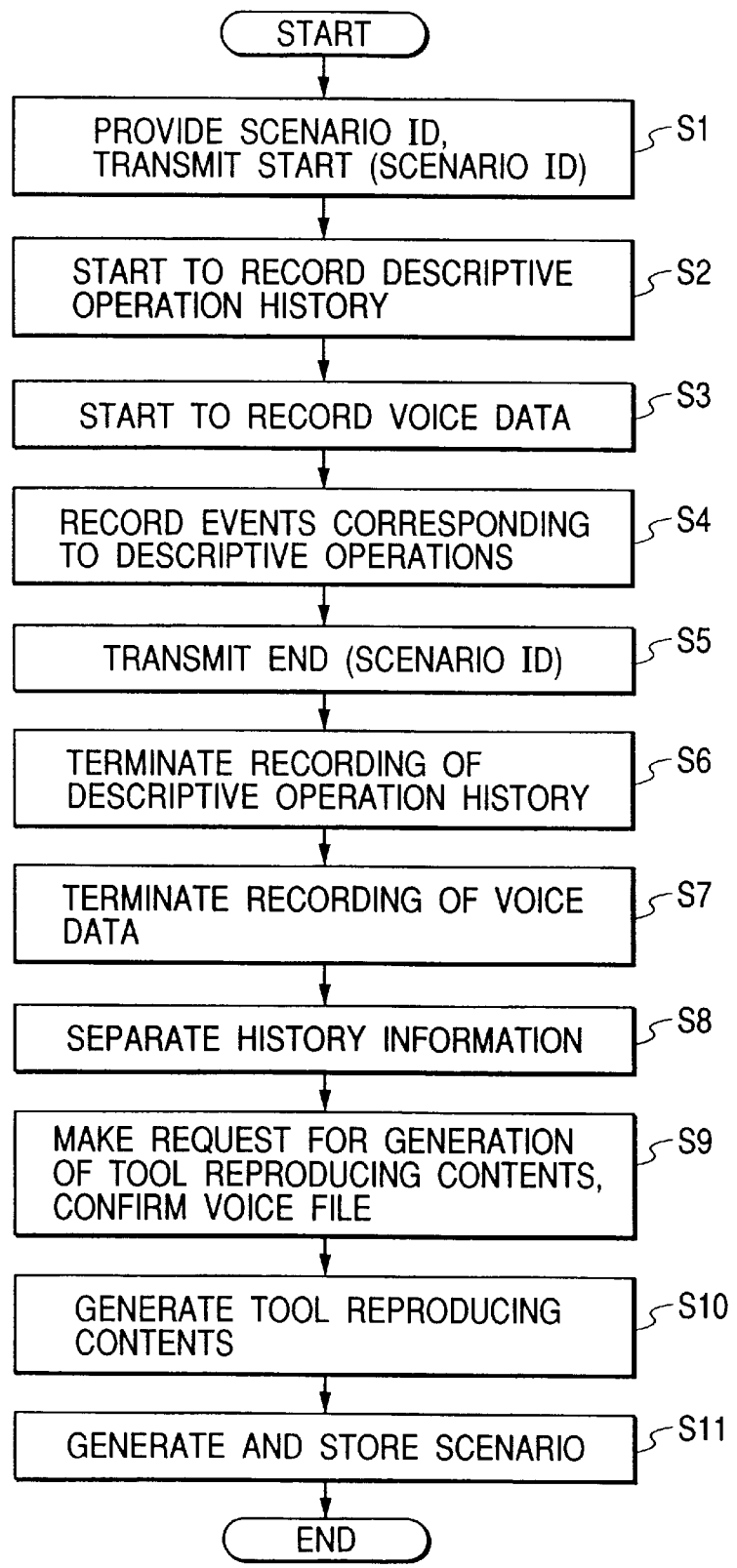
FIG. 11 is a flowchart for describing the flow of processing of a scenario generation device.

FIG. 11 is a flowchart for describing the flow of processing of the scenario generation device. When the start button 34 is clicked in FIG. 11, a simulated presentation is started. Simultaneously with this, a scenario ID is supplied from the system, and a START (scenario ID); event is sent to the descriptive operation history holding part 6, the speaker information input part 3 and the speaker information holding part 4 (Step S1). Next, the descriptive operation history information part 6 records the received START (scenario ID); event therein (Step S2). On the other hand, the speaker information input part 3 having received the START (scenario ID); event therein is brought to an on state (voice-recorded state), so that the speaker information input part 3 starts to transmit voice data to the speaker information holding part 4. Thus, the speaker information holding part 4 accepts the scenario ID from the system and thereby starts to write the voice data transmitted from the speaker information input part 3 into a voice file corresponding to the scenario ID (Step S3).

When the simulated presentation is kept on doing in the above-described state and the reproduction of various contents, control on the reproduction of the contents, the action of descriptions by the presentation tools, etc. are performed by the descriptive operation input part 5 comprised of the mouse 23 and the screen 30, events corresponding to their operations are recorded in the descriptive operation history holding part 6 (Step S4). When the end button 35 is now clicked upon completion of all the descriptions, the simulated presentation is terminated. Simultaneously with this, an END (scenario ID); event is transmitted to the descriptive operation history holding part 6, the speaker information input part 3 and the speaker information holding part 4 (Step S5).

When the descriptive operation history holding part 6 receives the END (scenario ID); event therein, it records it therein and thereafter transmits the recorded history information to the scenario generation processing part 7 (Step S6). On the other hand, the speaker information input part 3 receives the END (scenario ID); event therein to thereby enter into an off state, thus terminating the transmission of the voice data to the speaker information holding part 4. When the speaker information holding part 4 receives the END (scenario ID); event therein, it terminates the writing of the voice data into their corresponding voice files with the completion of the transmission of the voice data from the speaker information input part 3 (Step S7).

The scenario generation processing part 7 receives history information therein. Thereafter, the history information separating part 11 analyzes the history information and separates the history information into history information about control operations and history information about descriptive operations (Step S8). Next, the scenario generation processing part 7 makes a request to the descriptive operation contents generating part 8 for the generation of contents to reproduce the descriptive operations by the presentation tools, based on the history information about the descriptive operations separated by the history information separating part 11. Further, the scenario generation processing part 7 confirms the voice file retained in the speaker information holding part 4 (Step S9). The descriptive operation contents generating part 8 generates the contents of descriptive operations according to the request and transfers the generated contents to the descriptive operation contents holding part 9. Simultaneously, the descriptive operation contents generating part 8 sends the completion of the generation of the contents to the scenario generation processing part 7 (Step S10). When the scenario output part 14 in the scenario generation processing part 7 adds information about the relationship of synchronism and reproduction between the contents of descriptive operations to the history information related to the control operations and the history information about the descriptive operations to thereby generate a scenario and confirms the completion of the generation of the contents by the descriptive operation contents generating part 8, the scenario output part 14 transfers the generated scenario to the scenario information holding part 10 where it is retained therein (Step S11). The flow from the simulated presentation to the generation of the scenario is terminated in this way.

A second embodiment of the present invention will next be explained. In the second embodiment, a scenario generation processing part 7 is further provided with a noted contents detecting part 12. Further, a scenario output part 14 has the function of determining the layout of contents on the basis of the result of detection by the noted contents detecting part 12.

The noted contents detecting part 12 detects contents that an explainer would focus thereon in regards to their description upon execution of a simulated presentation, i.e., contents to be noted, based on events related to presentation tools 40, which are separated by a history information separating part 11. For example, contents specified by a presentation tool is detected as the contents to be noted. In the example of the event sequences related to the presentation tools 40 in the first embodiment shown in FIG. 8, it is detected that "play01" has been noted by the explainer for 36 seconds between 0:03.54 and 0:04.30 as viewed from records in the second and third lines and "play02" has been noted by the explainer for 36 seconds between 0:05.54 and 0:06.30 as viewed from records in the fourth and fifth lines.

The scenario output part 14 determines the layout of contents so that the noted contents detected by the noted contents detecting part 12 is more effectively reproduced upon reproduction. A rule for determining this layout is as follows: When another contents is reproduced through another Window simultaneously with the reproduction of contents to be noted, a Window size of the contents to be noted is enlarged and a Window size of another contents is reduced while the relationship in vertical and left and right directions between the contents is being maintained.

FIG. 12 is a diagram showing an example of a rule for determining the layout of contents to be noted. When two contents are simultaneously reproduced as indicated by each of (A) through (D) in FIG. 12 and either one of them is detected as the contents to be noted, a Window size of the noted contents is enlarged and a Window size of the other contents is reduced while the relationship in vertical and left and right directions between the contents is being held. Even when three contents are simultaneously reproduced as indicated by (E) and (F) and four contents are simultaneously reproduced as indicated by (G), Window sizes of noted contents are enlarged and Window sizes of the remaining contents are reduced while the relationship in display position between the contents is being maintained in the same manner as described above.

When other contents are not reproduced through other Windows simultaneously with the reproduction of the noted contents, a Window size of the noted contents may simply be enlarged.

As a specific example, an example illustrative of a change process effected on the scenario 55 shown in FIG. 10 will be explained below based on the explainer's note given to play01 for 36 seconds between 0:03.54 and 0:04.30 referred to above.

Figure 13:
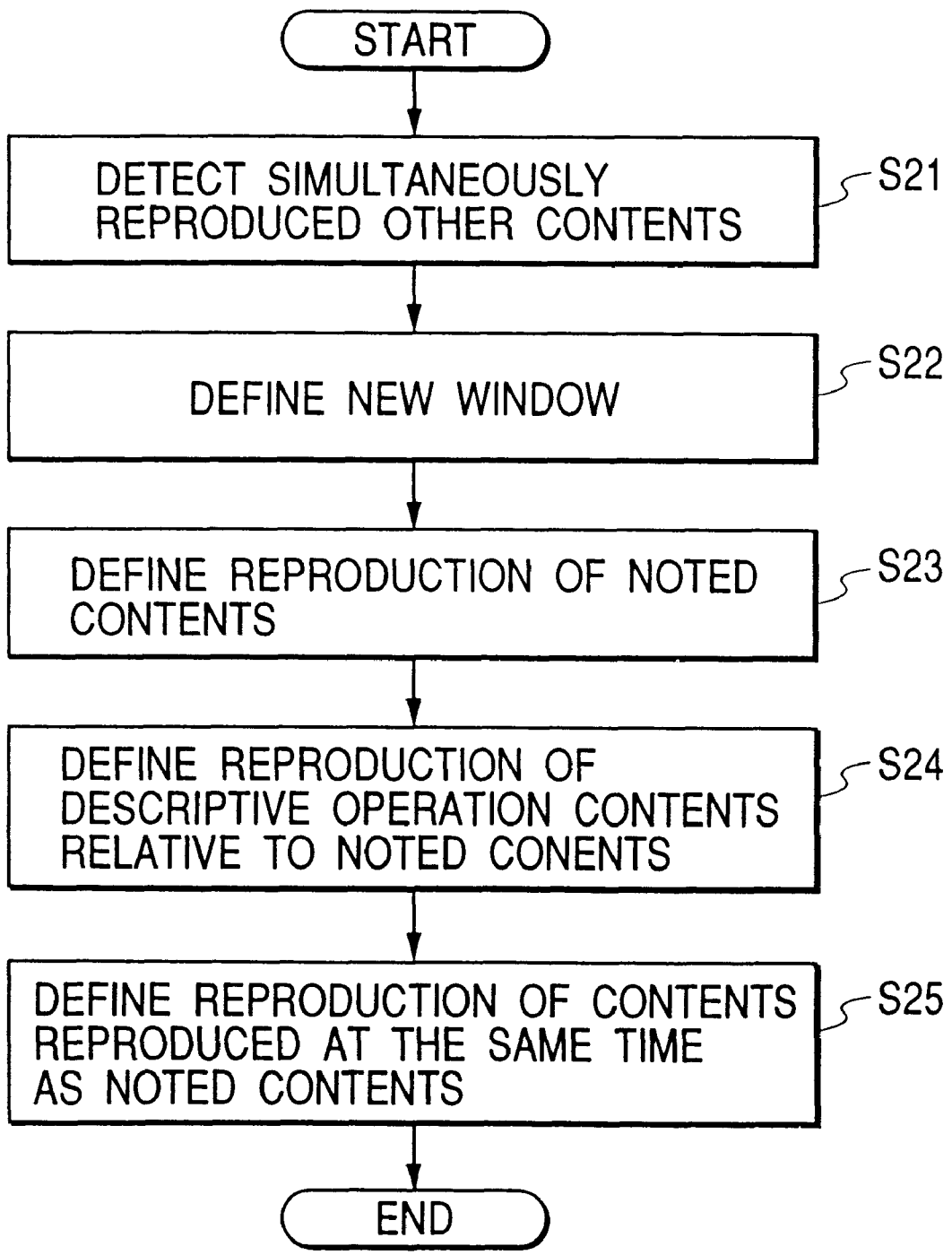
FIG. 13 is a flowchart for describing the flow of processing at the detection of the contents to be noted.

FIG. 13 is a flowchart showing the flow of processing at the detection of contents to be noted. Based on the event sequences related to the control operations shown in FIG. 5, other contents reproduced for a time interval between 0:03.54 and 0:04.30 in which the explainer's note given to play01 reproduced in a "subarea No. 1" is detected (Step S21). In the present example, the reproduction of play02 in a "subarea No. 2" for a time interval between 0:01.00 and 0:08.00 is detected.

Figure 12A:
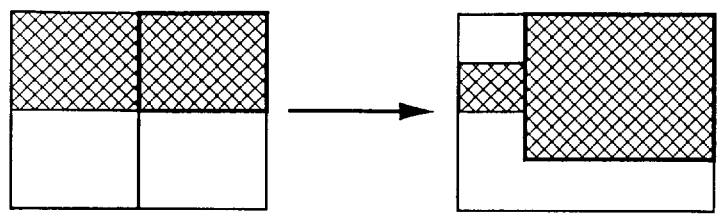
FIGS. 12A–G are diagrams showing an example of a layout decision rule for contents to be noted.
Figure 12B:
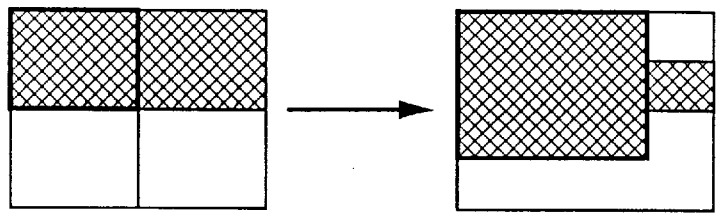
Figure 12C:
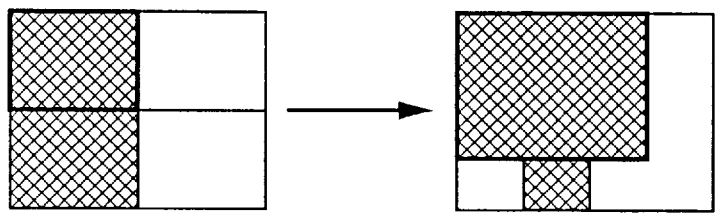
Figure 12D:
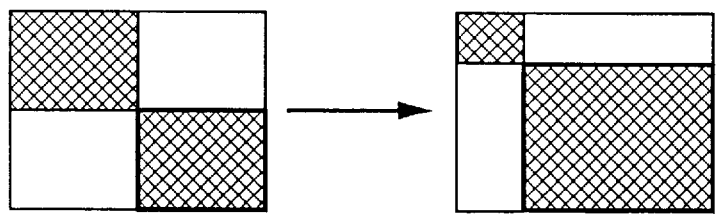
Figure 12E:
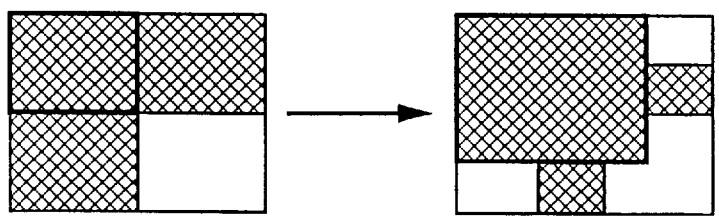
Figure 12F:
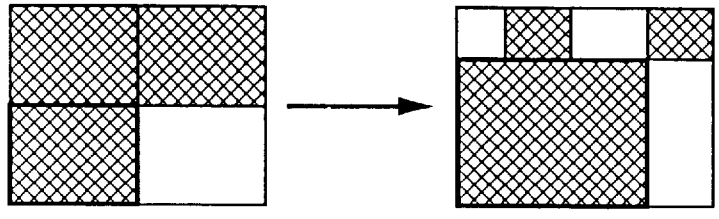
Figure 12G:
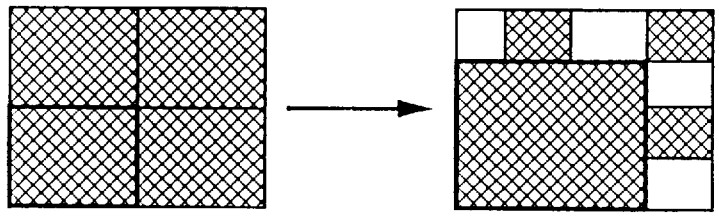

Next, the contents are simultaneously reproduced in the "subarea No. 1" and "subarea No. 2" in the present example. Since attention is given to the contents of the "subarea No. 1" of them, the sizes and layout of the Windows are defined as shown in FIG. 12B (Step S22). Thus, two new Windows are added to and defined in the <head> element in the example of the scenario 55 shown in FIG. 10, and a Window for the display of the contents of descriptive operations is additionally defined.

FIG. 14 is a diagram showing a partial scenario in which new Windows are defined. According to the scenario 55a shown in FIG. 14, three lines marked with asterisks at the beginning of the tops thereof are added lines. Namely, two <Window> elements are first added to a <head> element. Here, the attribute of "adjustment" defines processing at the time that a Window size and an object size differ from each other. An attribute value "fit" means that the object size is automatically controlled so as to coincide with the Window size. A third line marked with an asterisk at the beginning of the top thereof is added as a Window for the display of the contents of descriptive operations.

Next, the reproduction of the contents to be noted is defined (Step S23). Namely, one line which defines the reproduction of the image file "Image01.jpg" of the noted contents in the scenario 55 shown in FIG. 10, is replaced by three reproduction definitions together with a <sequential> element.

FIG. 15 is a diagram showing a partial scenario indicative of the re-definition of the contents to be noted. According to the scenario 55b shown in FIG. 15, five lines marked with asterisks at the beginning of the tops thereof are added lines. Namely, they are two lines for <sequential> elements and three lines in which the reproduction of the noted contents is re-defined.

Next, the reproduction of descriptive operation contents relative to the noted contents is defined (Step S24). In the scenario 55 shown in FIG. 10, the definition of reproduction of descriptive operation contents relative to the noted contents exists in the line following that for the definition of the reproduction of the noted contents. The definition for the reproduction of the descriptive operation contents is performed herein.

FIG. 16 is a diagram showing a partial scenario indicative of the definition for the reproduction of descriptive operation contents relative to noted contents. According to the scenario 55c shown in FIG. 16, a line marked with an asterisk at the beginning of the top thereof is a modified or changed line. In the line, an attribute value of an attribute "Window" for the display of the descriptive operation contents is changed.

Finally, the reproduction of contents reproduced for the same time interval as that for the noted contents is defined (Step S25). One line, which defines the reproduction of a motion picture file "Mov01.mov" corresponding to another contents defined so as to be reproduced parallel to the noted contents in the scenario 55 shown in FIG. 10, is replaced with a <sequential> element and three reproduction definitions for the motion picture file.

FIG. 17 is a diagram showing a partial scenario indicative of the definition for the reproduction of contents reproduced in the same time as that for contents to be noted. According to the scenario 55d shown in FIG. 17, five lines marked with asterisks at the beginning of the tops thereof are added lines. Namely, they are two lines for <sequential> elements and three lines which have re-defined the reproduction of the contents reproduced in the same time as that for the noted contents.

From the above, the layout of the noted contents detected by the noted contents detecting part 12, which are more effectively reproduced upon reproduction, is determined and the corresponding scenario based on it is generated.

A third embodiment of the present invention will next be described. In the third embodiment, a scenario generation processing part 7 is further provided with a reproduced contents information detecting part 13. Further, a scenario output part 14 has the function of describing link information for respective contents in a generated scenario, based on the result of detection by the reproduced contents information detecting part 13.

The reproduced contents information detecting part 13 receives therein history information related to control operations separated by history information separating part 11 to thereby detect information about the reproduced contents, i.e., the name of the contents. If the history information about the control operations shown in FIG. 5, for example, is inputted to the reproduced contents information detecting part 13, then the reproduced contents information detecting part 13 searches PlayStart; event and obtains a contents name of the argument thereof. In the example illustrated in FIG. 5, an image file "Image01.jpg", a text file "Text01.txt", and a motion picture file "Mov01.mov" are detected. Of these contents, contents types to embed link information can be set in advance by setting operating environments with a set button 38 on a screen 30. A description will now be made below of an example in which the scenario output part 14 embeds link information for respective contents of an image file "Image01.jpg" and a motion picture file "Mov01.mov", for example in the basic scenario 52 shown in FIG. 7.

FIG. 18 is a diagram showing a generated example of a scenario with link information embedded therein. According to the scenario 56 shown in FIG. 18, four lines marked with asterisks at the beginning of the tops thereof indicate lines added to embed the link information. Now, <Original> elements represent link from components thereof such as an <Image> element, a <Move> element, etc. to contents indicated by attribute values of "src" attributes of the <Original> elements. Namely, when the contents is clicked during scenario reproduction by representing elements indicative of the contents such as the <Image> element, the <Move> element, etc. as members of the <Original> elements, and causing the elements indicative of the respective contents to specify or designate files to be reproduced, as the attribute values of the "src" attributes of the <Original> elements thereof, the contents described herein are separated from the viewpoint of the entire synchronism and reproduction relationship and can be reproduced in parallel.

A fourth embodiment of the present invention will next be explained.

Figure 19:
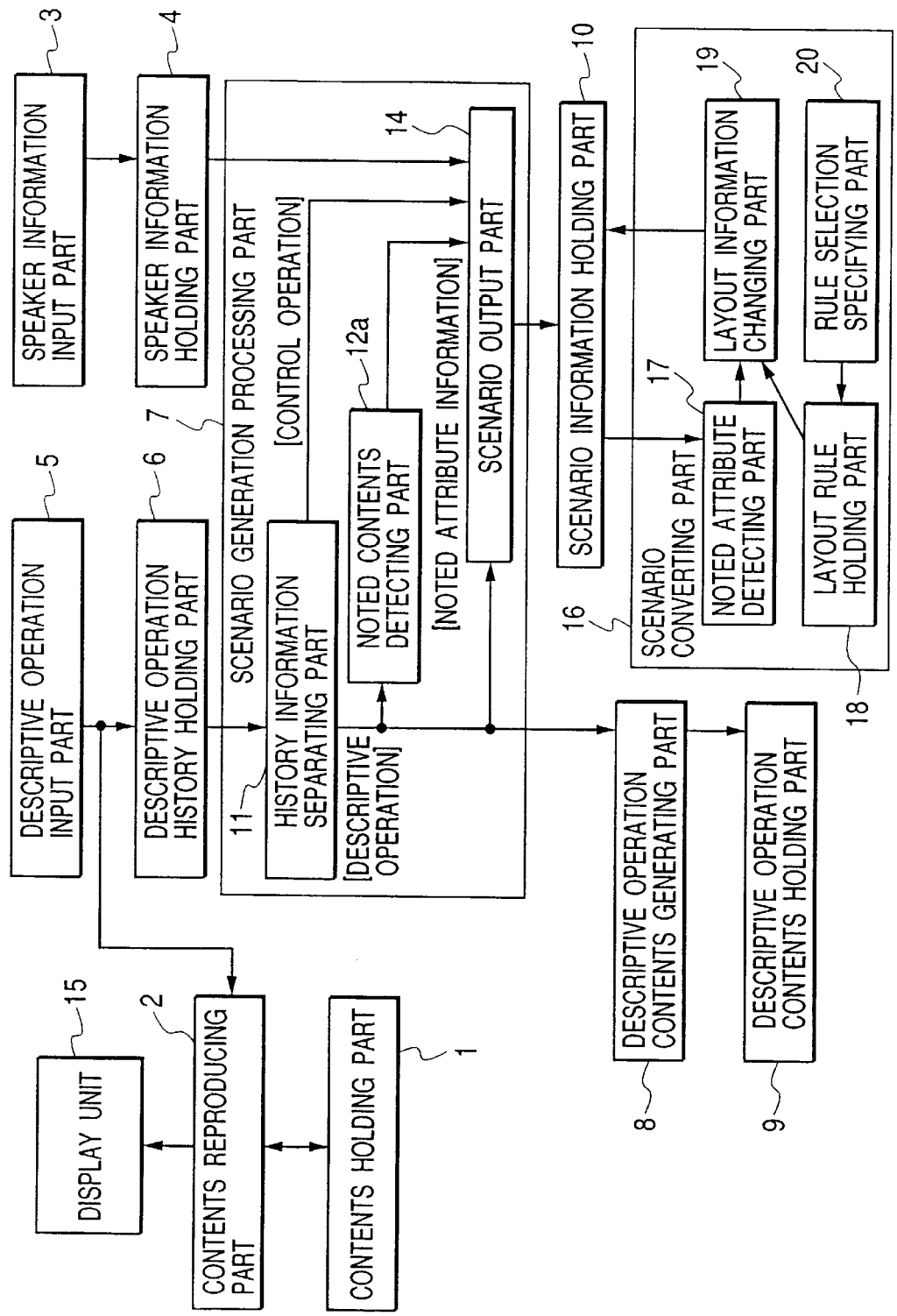
FIG. 19 is a diagram illustrating a configuration of the principle of a device for generating a scenario used for presentation materials, according to a fourth embodiment.

FIG. 19 is a diagram illustrating a configuration of the principle of a device for generating a scenario suitable for use as presentation documents or materials, according to the fourth embodiment. In FIG. 19, the same elements of structure as those shown in FIG. 1 are identified by the same reference numerals and their detailed description will be omitted. The scenario generation device is provided with a contents holding part 1, a contents reproducing part 2, a speaker information input part 3, a speaker information holding part 4, a descriptive operation input part 5, a descriptive operation history holding part 6, a scenario generation processing part 7, a descriptive operation contents generating part 8, a descriptive operation contents holding part 9, a scenario information holding part 10 and a scenario converting part 16. Here, the scenario generation processing part 7 has a history information separating part 11, a noted contents detecting part 12a and a scenario output part 14. The scenario converting part 16 has a noted attribute detecting part 17, a layout rule holding part 18, a layout information changing part 19, and a rule selection specifying part 20. A display unit 15 for displaying a screen for performing control operations of contents and displaying reproduced contents is connected to the output of the contents reproducing part 2.

The noted contents detecting part 12a in the scenario generation processing part 7 detects contents specified and operated by an explainer using a presentation tool from second history information related to descriptive operations separated by the history information separating part 11 and outputs noted attribute information indicating that the corresponding contents is contents to be noted, to the scenario output part 14.

The noted attribute detecting part 17 in the scenario converting part 16 detects the noted attribute information from the scenario information already generated and retained in the scenario information holding part 10. The layout rule holding part 18 retains a plurality of layout rules therein. The layout information changing part 19 changes layout information of scenario information so that contents indicative of the noted attribute information detected according to the corresponding layout rule is effectively reproduced upon reproduction. The rule selection specifying part 20 has the function of selecting and specifying a conversion rule applied to the layout rule holding part 18 upon scenario conversion.

The history information separating part 11 in the scenario generation processing part 7 separates history information into first history information related to control operations and second history information related to command operations. The separated first history information related to the control operations is supplied to the scenario output part 14 where a basic scenario is generated. The second history information related to the descriptive operations separated by the history information separating part 11 is supplied to the descriptive operation contents generating part 8. Descriptive operation contents generated herein and used to reproduce the command operations is retained in the descriptive operation contents holding part 9.

In the present embodiment, the noted contents detecting part 12a detects the command operations done by the explainer using each presentation tool 40 from the second history information related to the command operations separated by the history information separating part 11 and supplies the noted attribute information to the scenario output part 14. The scenario output part 14 generates a scenario descriptive of contents to be specified, of the generated basic scenario being contents to be noted, with respect to the former contents. A generated example of the scenario outputted from the scenario output part 14 is shown in FIG. 20.

FIG. 20 is a diagram illustrating a generated example of a scenario which has taken into consideration the contents to be noted. According to the scenario 54a which allows for the noted contents, the scenario output part 14 embeds a <MOVE> element corresponding to the reproduction of movements at the operation of each presentation tool 40 in the basic scenario 52 shown in FIG. 7. When the scenario 54 allowing for the descriptive operation contents shown in FIG. 9 is generated, the scenario output part 14 causes a new "noted" attribute to be contained in a component to be specified, of the <MOVE> element through the use of the noted attribute information supplied from the noted contents detecting part 12a and gives "True" to an attribute value thereof. It is cleared that the corresponding element is given noted contents owing to the attribute value.

The scenario information capable of making a decision as to the noted contents is generated in this way. The generated scenario information is retained in the scenario information holding part 10.

The scenario converting part 16 performs a scenario converting process related to the layout of the noted contents on the scenario information retained in the scenario information holding part 10. First, the noted attribute detecting part 17 analyzes the corresponding scenario to be converted retained in the scenario information holding part 10 and thereby detects the corresponding noted contents, based on attribute information of respective contents described in the scenario information. The layout information changing part 19 determines the layout of the detected noted contents more effectively reproduced upon scenario reproduction in accordance with the layout rule retained in the layout rule holding part 18 and thereby performs scenario conversion.

The layout rule holding part 18 is capable of preparing a plurality of layout rules other than the layout change rules illustrated in FIG. 12 by way of example. In this case, the layout rule holding part 18 selects and specifies a conversion rule applied by the rule selection specifying part 20 upon the scenario conversion. The layout information changing part 19 applies the selected and specified layout rule to thereby determine a layout.

Particularly when video information is inputted via the speaker information input part 3 as speaker information, it is useful to allow a change in layout according to the degree of importance of the reproduction of the video information in regard to the relationship between the reproduction of the video information and the reproduction of contents. By doing so, a plurality of presentation scenarios subjected to different representations intended for applications can be created based on one simulated presentation.

While the input to the speaker information input part 3 has been explained as the voice information in the above description, the video information can be also handled in addition to the voice information as described above. In this case, it is needless to say that the video information is retained even in the speaker information holding part 4 and the relationship between the synchronism and reproduction of the video information can be defined in a scenario finally reproduced according to a method similar to the aforementioned method.

The scenario generated in the present device is not limited to the aforementioned describing method. The scenario may be represented using scenario representation languages such as RTSL (Real Time Session Language) defined by Real Networks corp., SMIL (Synchronized Multimedia Integration Language) whose standardization is pursued by the Synchronized Multimedia Working Group of W3C (World Wide Web Consortium), etc.

The contents of processing by the functions to be held by the respective computers referred to above can be described in programs recorded in recording media readable by the computers. The execution of the above-described programs by the computers allows the implementation of the processing by the computer. A magnetic recording device, a semiconductor memory, etc. are known as the computer-readable recording media. When the programs are circulated or put on the market, they are put on the market with being stored in transportable recording media such as CD-ROM (Compact Disk Read Only Memory), a floppy disk, etc. Alternatively, they are stored in a storage device of a computer connected via a network and may be transferred to other computers through the network. Upon execution of the programs by the computer, they are stored in a hard disk device lying within the computer and loaded into a main memory to execute them.

As described above, the present invention is constructed so as to have a part for recording speaker information and descriptive operations while contents corresponding to presentation documents or materials are being successively selected, reproduced, and operated under control, a part for generating a basic scenario, based on history information about the descriptive operations and history information related to control operations, adding the relationship between synchronism and reproduction of the speaker information to the basic scenario and adding the relationship of synchronism and reproduction between tool reproducing contents generated based on the history information related to the descriptive operations thereto to thereby generate a scenario, and a part for generating tool reproducing contents of a motion picture for reproducing the operation of a presentation tool. Owing to the above construction, an explainer performs a stimulated presentation while concentrating on the explanation of the materials alone without caring about fine details such as a on-reproduction layout, etc., whereby a scenario can be generated which reproduces an effective presentation.

The scenario created in this way can be always subjected to a presentation asynchronously and on a non-facing basis by being placing in each computer on the network together with the contents.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. A device for generating a scenario suitable for use as presentation materials, wherein a reproduced scenario describing layout information of respective contents and a relationship of synchronism and reproduction between the contents in multimedia contents used for a presentation, is generated, comprising:

a contents holding part that retains therein the multimedia contents including text data, image data, motion picture data, voice data and programs;

a contents reproducing part that reads corresponding contents from said contents holding part based on control operations of an explainer and reproducing and displaying said read contents;

a speaker information input part that receives therein speaker information including at least voice information upon reproduction of the multimedia contents by said contents reproducing part;

a speaker information holding part that retains therein the speaker information inputted from said speaker information input part;

a descriptive operation input part that receives therein descriptive operations including control operations relative to said contents reproducing part and command operations relative to a specific display point of the reproduced contents displayed by said contents reproducing part;

a descriptive operation history holding part that retains therein history information related to the descriptive operations inputted by said descriptive operation input part;

a scenario generation processing part that determines layout information of respective contents and the relationship of synchronism and reproduction between the contents in relation to a group of the contents reproduced by said contents reproducing part in accordance with the history information, a group of descriptive operation contents for reproducing the command operations, and the speaker information retained in said speaker information holding part to thereby generate a reproduced scenario having a multimedia title;

a descriptive operation contents generating part that generates the descriptive operation contents of an image for reproducing command operations, based on information about said command operations in the history information;

a descriptive operation contents holding part that retains therein the descriptive operation contents generated by said descriptive operation contents generating part; and a scenario information holding part that retains therein the reproduced scenario generated by said scenario generation processing part.

2. The device according to claim 1, wherein said contents reproducing part has a user interface part which sequentially reproduces one or more visible contents, based on a reproduction operation command given by an explainer and simultaneously displays the reproduced contents on display areas specified by the explainer.

3. The device according to claim 2, wherein said user interface part has a plurality of contents display areas capable of individually displaying the reproduced contents, a contents list display area for displaying the contents retained in said contents holding part in list form, a tool display area for displaying tools used to perform command operations on the reproduced contents, and a group of buttons for providing instructions for operations related to the generation of the scenario.

4. The device according to claim 3, wherein said contents reproducing part selects one of icons for the contents displayed on said contents list display area of said user interface part in list form in response to the operation input from said descriptive operation input part, detects that said icon is dragged and dropped to said one contents display area and sets the detected result as a command for reproducing the contents corresponding to the selected icon.

5. The device according to claim 1, wherein said scenario generation processing part has a history information separating part which receives and analyzes history information retained in said descriptive operation history holding part and separates the history information into first history information related to the control operations and second history information related to the command operations, and a scenario output part-which outputs a scenario describing layout information of respective contents and the relationship of synchronism and reproduction between the contents therein in accordance with a predetermined format, based on the first history information and second history information separated by said history information separating part and the speaker information retained in said speaker information holding part.

6. The device according to claim 5, wherein said scenario generation processing part has a noted contents detecting part which detects contents specified and operated from the second history information separated by said history information separating part and outputs layout change information about the corresponding contents and other in-reproduction contents to said scenario output part.

7. The device according to claim 6, wherein said layout change information is information re-laid out so that display areas for the contents detected while being reproduced in parallel increase in size and display areas for other in-reproduction contents are reduced in size while mutual positional relations thereof are being maintained in display areas excluding the display areas for said detected contents.

8. The device according to claim 5, wherein said scenario generation processing part has a noted contents detecting part which detects contents specified and operated from the second history information separated by said history information separating part and outputs noted attribute information of the corresponding contents to said scenario output part.

9. The device according to claim 8, further including a scenario changing part which changes layout information of contents, based on the noted attribute information of the respective contents described in the scenario information retained in said scenario information holding part.

10. The device according to claim 9, wherein said scenario changing part includes a noted attribute detecting part which detects the noted attribute information from the scenario information retained in said scenario information holding part to thereby specify contents to be noted, a layout rule holding part which retains a plurality of layout rules therein, a layout information changing part which changes layout information about the scenario information laid out so that display areas for said specified contents increase in size and display areas for other contents while being reproduced in parallel are reduced in size while mutual positional relations thereof are being maintained in display areas excluding the display areas for said specified contents, and a rule selection specifying part which selects and specifies a conversion rule applied upon scenario conversion from the plurality of layout rules retained in said layout rule holding part.

11. The device according to claim 5, wherein said scenario generation processing part has a reproduced contents information detecting part which detects information about in-reproduction contents from the first history information separated by said history information separating part and outputs link information for the corresponding contents embedded in said scenario to said scenario output part.

12. A method of generating a scenario suitable for use as presentation materials, wherein a reproduced scenario describing layout information of respective contents and a relationship of synchronism and reproduction between the contents in multimedia contents used for a presentation is generated, comprising the following the steps of:

reproducing and displaying the multimedia contents including text data, image data, motion picture data, voice data and programs, based on reproduction operations of an explainer;

recording descriptive operations including control operations of said explainer and command operations relative to a specific display point of said displayed reproduced contents and recording speaker information of said explainer, including at least voice information;

determining layout information of respective contents and the relationship of synchronism and reproduction between the contents in relation to a group of the reproduced contents, a group of descriptive operation contents for reproducing the command operations and the recorded speaker information of said explainer, based on said recorded control operations, thereby to generate a reproduced scenario having a multimedia title; and generating said group of descriptive operation contents, based on information about the command operations of said recorded descriptive operations.

13. A computer-readable recording medium having recorded therein a scenario generation program for presentation materials, for generating a reproduced scenario describing layout information of respective contents and the relationship of synchronism and reproduction between the contents in multimedia contents used for a presentation, comprising:

a contents reproducing part that reads and reproduces the corresponding contents from the multimedia contents including text data, image data, motion picture data, voice data and programs, based on control operations of an explainer;

a speaker information recording part that receives and records therein speaker information including at least voice information upon reproduction of the multimedia contents by said contents reproducing part;

a descriptive operation recording part that receives therein descriptive operations including control operations relative to said contents reproducing part and command operations relative to a specific display point of the reproduced contents displayed by said contents reproducing part and records the same therein as history information;

a scenario generation processing part that determines layout information of respective contents and the relationship of synchronism and reproduction between the contents in relation to a group of the contents reproduced by said contents reproducing part in accordance with the history information, a group of descriptive operation contents for reproducing the command operations and the speaker information retained in said speaker information holding part to thereby generate a reproduced scenario having a multimedia title; and a descriptive operation contents generating part that generates the descriptive operation contents of an image for reproducing control operations, based on information about the command operations in the history information.

* * * * *